United States Patent
Guo et al.

(10) Patent No.: US 8,351,644 B2
(45) Date of Patent: Jan. 8, 2013

(54) IMAGE DATA PROCESSING SYSTEMS FOR HIDING SECRET INFORMATION AND DATA HIDING METHODS USING THE SAME

(75) Inventors: Jing-Ming Guo, Taipei (TW); Jia-Jin Tsai, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 245 days.

(21) Appl. No.: 12/849,804

(22) Filed: Aug. 3, 2010

(65) Prior Publication Data

US 2011/0051995 A1    Mar. 3, 2011

(30) Foreign Application Priority Data

Sep. 1, 2009    (TW) .............................. 98129379 A

(51) Int. Cl.
*G06K 9/00*    (2006.01)
(52) U.S. Cl. ....................................................... 382/100
(58) Field of Classification Search .................... 382/100
See application file for complete search history.

(56) References Cited

U.S. PATENT DOCUMENTS

| | | | |
|---|---|---|---|
| 5,809,177 A * | 9/1998 | Metcalfe et al. .............. 382/251 |
| 6,671,068 B1 * | 12/2003 | Chang et al. .................... 358/1.9 |
| 6,801,664 B1 * | 10/2004 | Kobayashi et al. ........... 382/237 |
| 7,542,587 B2 * | 6/2009 | Tian et al. ...................... 382/100 |
| 7,660,429 B2 * | 2/2010 | Shaked et al. ................. 382/100 |
| 2002/0106102 A1 * | 8/2002 | Au et al. ........................ 382/100 |

* cited by examiner

*Primary Examiner* — Samir Ahmed
*Assistant Examiner* — Totam Le
(74) *Attorney, Agent, or Firm* — Wang Law Firm, Inc.; Li K. Wang; Stephen Hsu

(57) ABSTRACT

A system for hiding secret data in halftone images is disclosed. The system includes an image input module, a halftoning processing module and an image output module. The image input module reads an original image data and a secret image data. The halftoning processing module is coupled to the image input module and receives the original image data and the secret image data, performs a first error diffusion process to the original image to generate a first halftone image and performs a second error diffusion process to the original image data and the secret image data to generate a second halftone image. The image output image module is coupled to the halftoning processing module and outputs the first halftone image and the second halftone image, wherein the second error diffusion process comprises adding or subtracting a variable noise strength to or from each pixel of the secret image.

11 Claims, 14 Drawing Sheets

IMAGE DATA PROCESSING SYSTEMS FOR HIDING SECRET INFORMATION AND DATA HIDING METHODS USING THE SAME

CROSS REFERENCE TO RELATED APPLICATIONS

This Application claims priority of Taiwan Application No. 098129379, filed on Sep. 1, 2009, the entirety of which is incorporated by reference herein.

BACKGROUND OF THE INVENTION

1. Field of the Invention

The invention relates to data hiding, and more particularly, to data hiding methods and corresponding systems for hiding secret data into two or more halftone images using an adaptive noise-balanced error diffusion (ANBEDF) technique with moderate computational complexity.

2. Description of the Related Art

Digital halftoning is a process to display grayscale images with a two-tone texture pattern. Halftoning is mainly used as printouts for materials such as magazines, newspapers, and books, generating a black-and-white format. Halftoning mainly takes advantage of the fact that the human visual system is not highly sensitive, so that black and white pixels of a dense uniform grid may be used to represent a desired grayscale effect. Halftoning techniques can be mainly divided into two categories: single pixel processing, and neighboring pixel processing. For single pixel processing, a halftoning output can be obtained by comparing pixel values of every pixel of an original image with some masks. Ordered dithering, for example, is a well-known scheme in the single pixel processing field. For neighboring pixel processing, however, the halftoning output can not be simply obtained by comparing pixel values and a further filtering process is required. Error diffusion, for example, is a well-known scheme in the neighboring pixel processing field. Error diffusion produces good image quality and reasonable computational complexity. Therefore, error diffusion is typically adopted for embedding secret patterns in order to obtain better image quality of the halftoning output image.

Recently, transmittance of digital information over the Internet has rapidly grown. Digital data may be easily downloaded or manipulated or intentionally tampered with, thus making the issue of intellectual property protection more significant. Most multimedia files may be stored in a compressed bit stream format to save on storage space or transmission time. As a result, methods for data hiding have grown in significance. Embedding digital watermarks or digital signatures in multimedia content is one method of intellectual property protection for digital information, verification of ownership rights and assuring accuracy of digital information.

Hiding data in halftone images using a halftoning technique is commonly used for data hiding. In one technique, secret visual patterns are embedded into two or more halftone images. When implemented, the secret visual patterns can be clearly perceived when the halftone images are overlaid with each other. One method used to embed watermarks into the halftone images is the noise-balanced error diffusion (NBEDF) method. In the NBEDF method, an additive noise is adopted to force the pixels in the embedded images to be either correlative or independent, according to whether the pixel value in the watermark is black or white. The average color shifting error caused by the additive noise is compensated for by adding an equal amount of opposite noise to the neighboring unprocessed pixels. The NBEDF method may be simply implemented and visual decoding via printing an embedded image on transparencies is performed efficiently.

Although good image quality may be provided with the NBEDF method, the decoded pattern quality may significantly degrade such that deckle edge portions of the obtained secret image become visible when the additive noise is small. In addition, has also been observed that areas with different variances may show different degradation qualities, even if the same noise strength is added.

BRIEF SUMMARY OF THE INVENTION

It is therefore an objective to provide systems and data hiding methods for hiding data utilizing halftone images to embed a secret patterns of a secret image into two or more halftone images by a proposed Adaptive Noise-Balanced Error Diffusion (ANBEDF) method. Accordingly, a higher decoding rate is achieved for a same image quality as compared with conventional error diffusion methods.

An embodiment of a system for hiding secret data in halftone images, comprises an image input module, a halftoning processing module and an image output module. The image input module reads an original image data and a secret image data. The halftoning processing module is coupled to the image input module and receives the original image data and the secret image data, performs a first error diffusion process to the original image to generate a first halftone image and performs a second error diffusion process to the original image data and the secret image data to generate a second halftone image. The image output module is coupled to the halftoning processing module to output the first halftone image and the second halftone image, wherein the second error diffusion process comprises adding or subtracting a variable noise strength to or from each pixel of the secret image.

In one embodiment, a data hiding method for hiding data of a secret image into halftone images for use in a system which comprises at least one halftoning processing module and one image output module is provided. The method comprises the following steps. First, an original image and a secret image are received. Next, the halftoning processing module calculates a corresponding variance for each pixel of the original image. The halftoning processing module then obtains corresponding noise strength for each pixel by searching a look-up table with the calculated variance corresponding thereto. Thereafter, the halftoning processing module performs a first error diffusion process to the original image to generate a first halftone image and performs a second error diffusion process to the original image and the secret image to generate a second halftone image. Then, the image output module outputs the first halftone image and the second halftone image, wherein the secret image is obtained by decoding the first and second halftone images.

Data hiding methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention relates to methods and corresponding systems for hiding data utilizing halftone images, and more particularly, to data hiding methods and corresponding systems using a moderately computationally complex data hiding algorithm to embed a secret pattern (e.g. the watermark) into two or more halftone images with the proposed Adaptive Noise-Balanced Error Diffusion (hereinafter referred to as ANBEDF) method. One halftone image is obtained by traditional error diffusion (e.g. the Floyd error diffusion method), and the others are obtained by the ANBEDF method. The visual decoded secret pattern can be detected when the embedded error-diffused images are printed on transparencies and overlaid together. An improved decoded result can be obtained by using a simple XNOR operation. The proposed method employs the Quality-Noise Look Up Table (QNLUT) and optimized multipliers to control the adaptive noise strength according to a local variance value. Accordingly, a higher decoding rate is achieved for a same image quality as compared with conventional error diffusion methods.

In the embodiments of the invention, a grayscale or multi-scale image is converted to a halftone image by error diffusion processes. Methods for calculation of converting a grayscale or multi-scale image to a halftone image by error diffusion processes are well-known in the art, and thus detailed descriptions are omitted here for brevity while only results are listed in the following for reference.

Figure 2:
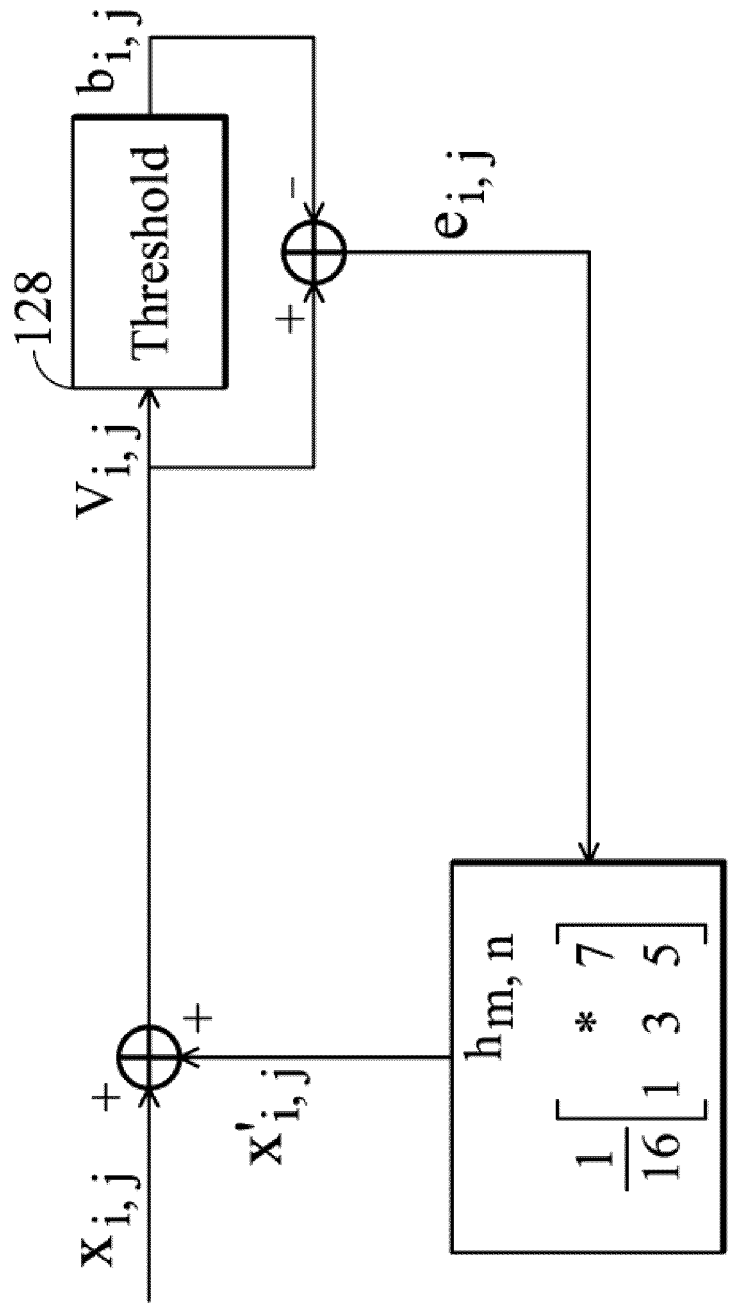
FIG. 2 is a schematic illustrating an embodiment of a standard error diffusion process.

Please refer to FIG. 2, which illustrates an embodiment of a standard error diffusion process. In this embodiment, the pixel value 255 is defined as a white pixel and the pixel value 0 is defined as a black pixel. The variable $x_{i,j}$ denotes the current input pixel value, and $x'_{i,j}$ denotes the diffused error sum added from the neighboring processed pixels. The variable $b_{i,j}$ denotes a binary output, and the Floyd error diffusion kernel $h_{m,n}$ is employed in the error diffusion process. The variable $v_{i,j}$ denotes the modified gray output, and the $e_{i,j}$ denotes the difference between the modified grayscale output $v_{i,j}$ and the binary output $b_{i,j}$. The relationships of $b_{i,j}$, $v_{i,j}$ and $e_{i,j}$ are as below:

$$v_{i,j} = x_{i,j} + x'_{i,j}, \text{ where } x'_{i,j} = \sum_{m=0}^{l}\sum_{n=-1}^{l} e_{i+m,j+n} \times h_{m,n} \quad (1)$$

$$e_{i,j} = v_{i,j} - b_{i,j}, \text{ where } b_{ij} = \begin{cases} 0, & \text{if } v_{i,j} < 128 \\ 255, & \text{if } v_{i,j} \geq 128 \end{cases} \quad (2)$$

Furthermore, in the following embodiments, two important criterions, PSNR (Peak Signal to Noise Ratio) and CDR (Correct Decode Rate) are used. The PSNR value may be an image quality difference measurement for images before and after the secret image has been embedded. Generally, the larger the PSNR value of the two images is, the smaller the difference therebetween is. If the PSNR value of the two images exceeds 30 dB, the difference between the two images may not be visible to the human eye. Therefore, a PSNR value may be used as a reference value of a predicted result. The CDR is a measurement to determine a similarity between an original secret pattern and a corresponding decoded secret pattern. For example, suppose a halftone image of size is P×Q, then the quality assessment PSNR may be defined as below:

$$PSNR = 10\log_{10} \frac{P \times Q \times 255^2}{\sum_{i=1}^{P}\sum_{j=1}^{Q}\left(x_{i,j} - \sum_{m,n \in R} w_{m,n} b_{i+m,j+n}\right)^2} \quad (3)$$

where $x_{i,j}$ denotes the original grayscale image, $b_{i,j}$ denotes the halftone image, $w_{m,n}$ denotes the Least-Mean-Square (LMS) trained human visual filter at position (m,n), and R denotes the support region of the human visual filter (e.g. the size of the filter may be fixed at 7×7). Two criterions are used to evaluate the CDR as defined below:

$$CDR = \frac{P \times Q - HD(W_{i,j}, W'_{i,j})}{P \times Q} \times 100\% \quad (4)$$

$$XNOR\ CDR = \frac{\sum_{i=1}^{P}\sum_{j=1}^{Q} W_{i,j} \odot W'_{i,j}}{P \times Q} \times 100\% \quad (5)$$

where $W_{i,j}$ and $W'_{i,j}$ denote the original secret pattern and the decoded secret pattern, respectively. The symbol HD(•) denotes the Hamming distance between the two patterns inside the parentheses. The symbol θ denotes the XNOR (Not exclusive OR) Boolean operation. The PSNR and CDRs defined above will be used for illustration.

Figure 1A:
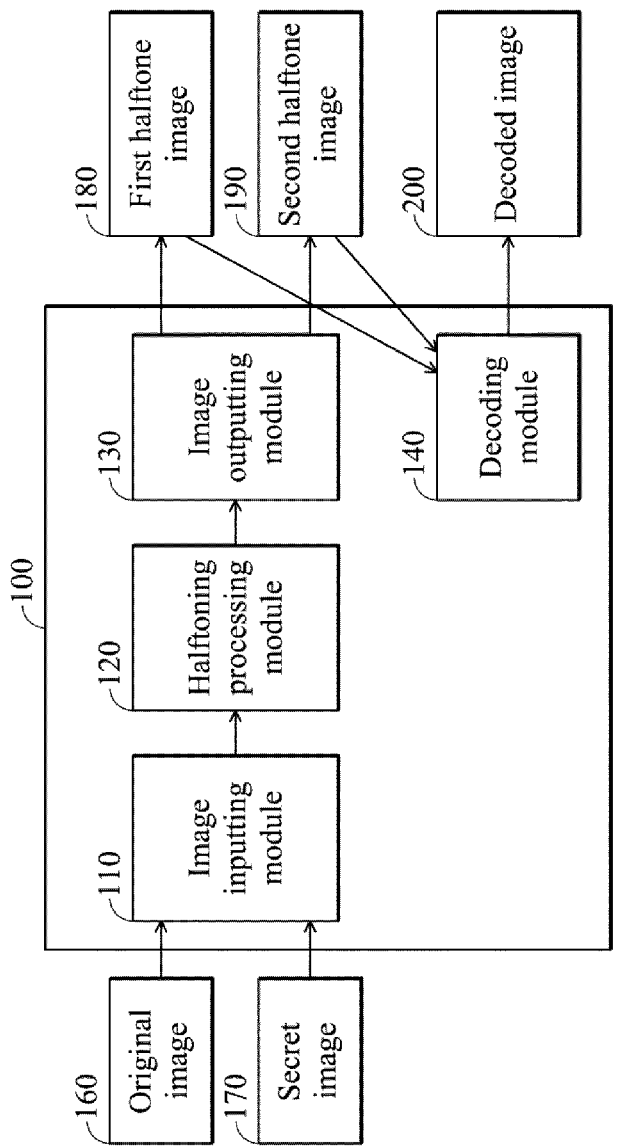
FIG. 1A shows an embodiment of a system for hiding secret data in halftone images according to the invention.

A system for hiding secret data in halftone images according to the invention is illustrated in the following. FIG. 1A shows an embodiment of a system for hiding secret data in halftone images according to the invention. As shown in FIG. 1, the system 100 at least comprises an image input module 110, a halftoning processing module 120, an image output module 130 and a decoding module 140. The image input module 110 reads an original image data 160 (e.g. a grayscale image) and a secret image data 170 (e.g. a watermark). The halftoning processing module 120 is coupled to the image input module 110 for receiving the original image data 160 and the secret image data 170 and generating two or more halftone images accordingly (i.e. the pixel value of which is either black (0) or white (255)). First, the halftoning processing module 120 may perform a first error diffusion process to the original image 160 to generate a first halftone image 180 and then perform a second error diffusion process to the original image data 160 and the secret image data 170 to generate at least one second halftone image 190. The first error diffusion process may utilize traditional error diffusion (e.g. Floyd error diffusion) to generate the first halftone image 180 while the second error diffusion process may utilize the ANBEDF method of the invention to add a corresponding variable noise strength to each pixel of the secret image 170 and then perform an error diffusion process with the original image 160 to generate the second halftone image 190. Detailed description of how the halftoning processing module 120 generates the first halftone image 180 and the second halftone image 190 are detailed below. Note that because the first halftone image 180 and the second halftone image 190 are both generated by error diffusion processes, the halftone images are essentially error diffusion images.

The image output module 130 (e.g. a printer or display device) is coupled to the halftoning processing module 120 to output the first halftone image 180 and the second halftone image 190 generated by the halftoning processing module 120 to users.

Figure 1B:
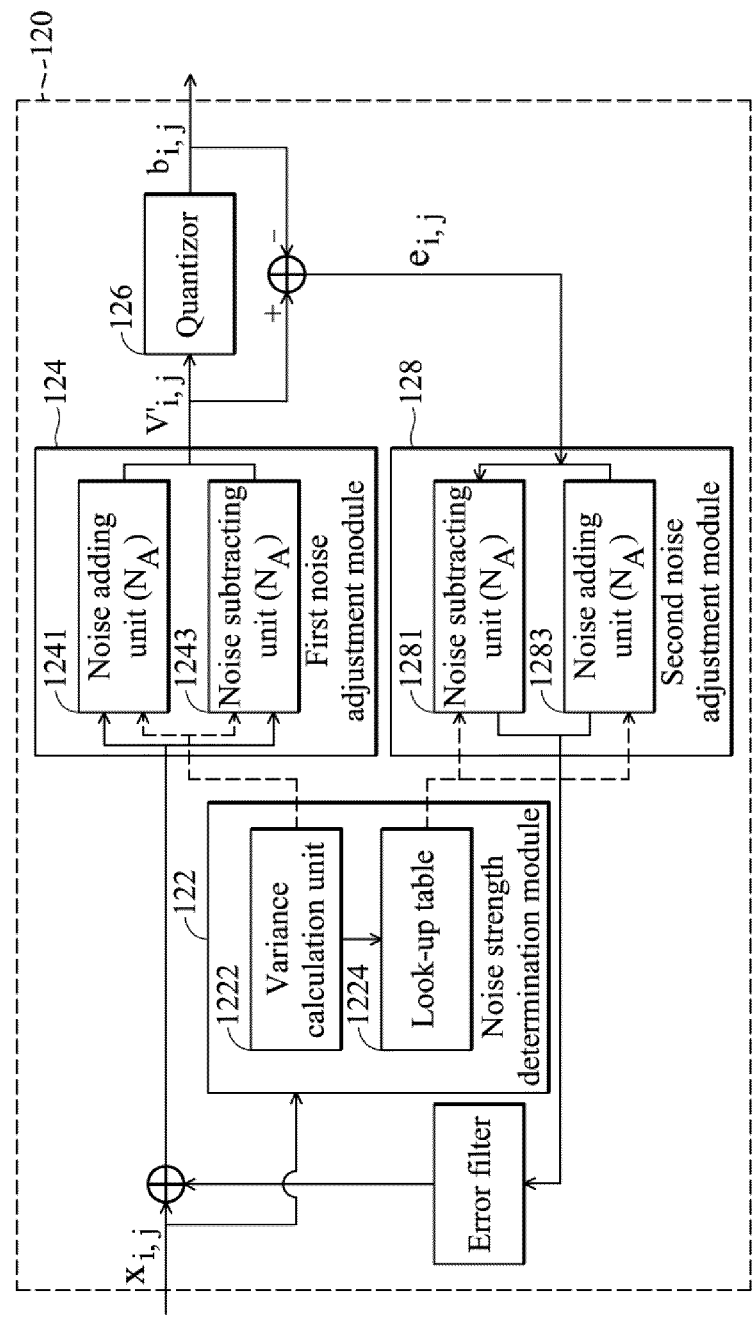
FIG. 1B shows an embodiment of a detailed architecture of a halftoning processing module of FIG. 1A according to the invention.

Refer to FIG. 1B, which shows an embodiment of a detailed architecture of a halftoning processing module of FIG. 1.A according to the invention. As shown in FIG. 1B, the halftoning processing module 120 may further comprise a noise strength determination module 122 for determining the variable noise strength to be added for each pixel of the second halftone image 190. The noise strength determination module 122 may further comprise a variance calculation unit 1222 and a look-up table 1224. The variance calculation unit 1222 may calculate a corresponding variance for each pixel of the original image 160, wherein the variance represents an area variance for a pixel area where a pixel is located. Detailed description of the variance will be provided later. The halftoning processing module 120 may further comprise a first noise adjustment module 124, a quantizer 126 and a second noise adjustment module 128. The first noise adjustment module 124 is coupled to the noise strength determination module 122 to determine whether to add or subtract the corresponding variable noise strength to or from the pixels of the first halftone image 180 to generate a pixel value of a specific position in the second halftone image 190 according to the pixel value of the first halftone image 180 and the pixel value of the secret image 170 in that specific position. The first noise adjustment module 124 may further comprise a noise adding unit 1241 and a noise subtracting unit 1243 for adding or subtracting a specific noise strength $N_A$, respectively. The first noise adjustment module 124 may determine to subtract the variable noise strength by using the noise subtracting unit 1243 when the pixel value of the first halftone image 180 or the pixel value of the secret image 170 represent a black pixel and may determine to add the variable noise strength by using the noise adding unit 1241 when both the pixel value of the first halftone image 180 and the pixel value of the secret image 170 represent black pixels or represent white pixels for calculation.

The quantizer 126 is coupled to the first noise adjustment module 124 to generate the second halftone image according to a predetermined threshold (e.g. 128). For example, if the predetermined threshold is set to be 128, the quantizer 126 will output a value 255 which represents a white pixel, if a pixel value of a pixel equals to or exceeds 128, while the quantizer 126 will output a value 0 which represents a black pixel, if a pixel value of a pixel is less than 128. The inputted pixel values may be converted to a binary value which is either black (0) or white (255) by the quantizer 126. Therefore, the quantizer 126 may convert an original grayscale image to a halftone image.

The second noise adjustment module 128 is coupled to the quantizer 126 and the first noise adjustment module 124 for receiving output of the quantizer 126 and the first noise adjustment module 124 and subtracting or adding the corresponding variable noise strength $N_A$ from or to each pixel in response to the noise adding or subtracting operation of the first noise adjustment module 124. Similarly, the second noise adjustment module 128 may further comprise a noise subtracting unit 1281 and a noise adding unit 1283 for subtracting or adding specific noise strengths, respectively.

When the first noise adjustment module 124 is used to add the variable noise strength to a pixel of the first halftone image 180 by using the noise adding unit 1241, the second noise adjustment module 128 is used to subtract the variable noise strength from the pixel of the first halftone image 180 by using the noise subtracting unit 1281. The second noise adjustment module 128 is used to add the variable noise strength to a pixel of the first halftone image 180 by using the noise adding unit 1283 when the first noise adjustment module 124 is used to subtract the variable noise strength from the a pixel of the first halftone image 180 by using the noise subtracting unit 1243. Detailed description of how the first noise adjustment module 124 determines whether to add or subtract the corresponding variable noise strength to or from the a pixel of the first halftone image 180 to generate a pixel value of a specific position in the second halftone image 190 according to the pixel value of the first halftone image 180 and the pixel value of the secret image 170 in the specific position is provided below.

In the embodiment, the objective of the ANBEDF method of the invention is to distribute the secret pattern information within the secret image into two or more halftone images. For brevity, two halftone images EDF1 and EDF2 are described below for demonstration, wherein the EDF1 represents a halftone image that is achieved by processing the original grayscale image with the standard error diffusion while the EDF2 represents a halftone image that is achieved using the ANBEDF method of the invention.

The variables $W_W$ and $W_B$ denote the set of locations of all the white and black pixels in the secret pattern, respectively, and the variables $(EDF1)_W$, $(EDF1)_B$, $(EDF2)_W$, and $(EDF2)_B$ denote the set of locations of all the white and black pixels in the EDF1 and the set of locations of all the white and black pixels in EDF2, respectively. The conditions and corresponding processes of the EDF2 are reorganized as below:

$$v_{i,j} = \begin{cases} x_{i,j} + x'_{i,j} - LUT(N_A), & (6) \\ \text{if } (i,j) \in \{[W_B \text{ and } (EDF1)_W] \text{ or } [W_W \text{ and } (EDF1)_B]\} \\ x_{i,j} + x'_{i,j} + LUT(N_A), \\ \text{if } (i,j) \in \{[W_W \text{ and } (EDF1)_W] \text{ or } [W_B \text{ and } (EDF1)_B]\} \end{cases}$$

$$e_{i,j} = \begin{cases} v_{i,j} - b_{i,j} + LUT(N_A), & (7) \\ \text{if } (i,j) \in \{[W_B \text{ and } (EDF1)_W] \text{ or } [W_W \text{ and } (EDF1)_B]\} \\ v_{i,j} - b_{i,j} - LUT(N_A), \\ \text{if } (i,j) \in \{[W_W \text{ and } (EDF1)_W] \text{ or } [W_B \text{ and } (EDF1)_B]\} \end{cases}$$

The explanation for the above two equations (6) and (7) is elaborated below. When practically applied, the EDF1 and EDF2 are printed onto two different transparencies, and then the two transparencies are overlaid to visually decode the secret pattern. Thereby, a black dot in either the EDF1 or EDF2 of the same position can produce a black overlaid result.

If the current processing position (i, j) satisfies the condition (i, j)$\in W_B$ and (i, j)$\in (EDF1)_W$, the corresponding position in the EDF2 is expected to be a black dot, thus producing a black overlaid result when the EDF1 and EDF2) are overlapped. Consequently, symbol $-LUT(N_A$ is added to the top part of the equation (6), where the notation $LUT(N_A)$ is temporarily used to represent that the value of additive noise $N_A$ is controlled by the trained look-up table which will be described below. If the processing position (i, j) meets the condition (i, j)$\in W_W$ and i, j)$\in (EDF1)_w$ the corresponding position in the EDF2 is expected to be a white dot, thus producing a white overlaid result when the EDF1 and EDF2 are overlapped. Consequently, $+LUT(N_A)$ is added to the bottom part of the equation (6). If the processing position (i, j) satisfies the condition (i, j)$\in W_W$ and (i, j)$\in (EDF1)_B$, the overlaid result is always black, regardless of whether it is black or white in the EDF2.

Consequently, $-LUT(N_A)$ is added to the top part of Eq. (6) in order to receive a compensating term $+LUT(N_A)$ in the neighborhood at the top part of the equation (7), increasing the probability of the neighbors becoming white. If the processing position (i, j) satisfies the condition (i, j)$\in W_B$ and (i, j)$\in (EDF1)_B$, hte overlaid result is always black, regardless of whether it is black or white in the EDF2. In general, if a pixel (i, j)$\in E_B$, the neighborhood of the pixel is more likely to be black. Consequently, $+LUT(N_A)$ is added to the bottom part of the equation (6) in order to receive a compensating term $-LUT(N_A)$ to the neighborhood of the bottom part of the equation (7), increasing the probability of the neighbors becoming black. It is to be noted that whether or not a positive or negative additive noise is added to equation (6), a compensating term must be added to equation (7) to preserve overall brightness. The extracted pattern becomes clearer when the value of $LUT(N_A)$ is increased, yet the quality of the EDF2 reduces as well. Therefore, the value of $LUT(N_A)$ may depend on whether the application is a CDR or quality oriented.

Figure 3:
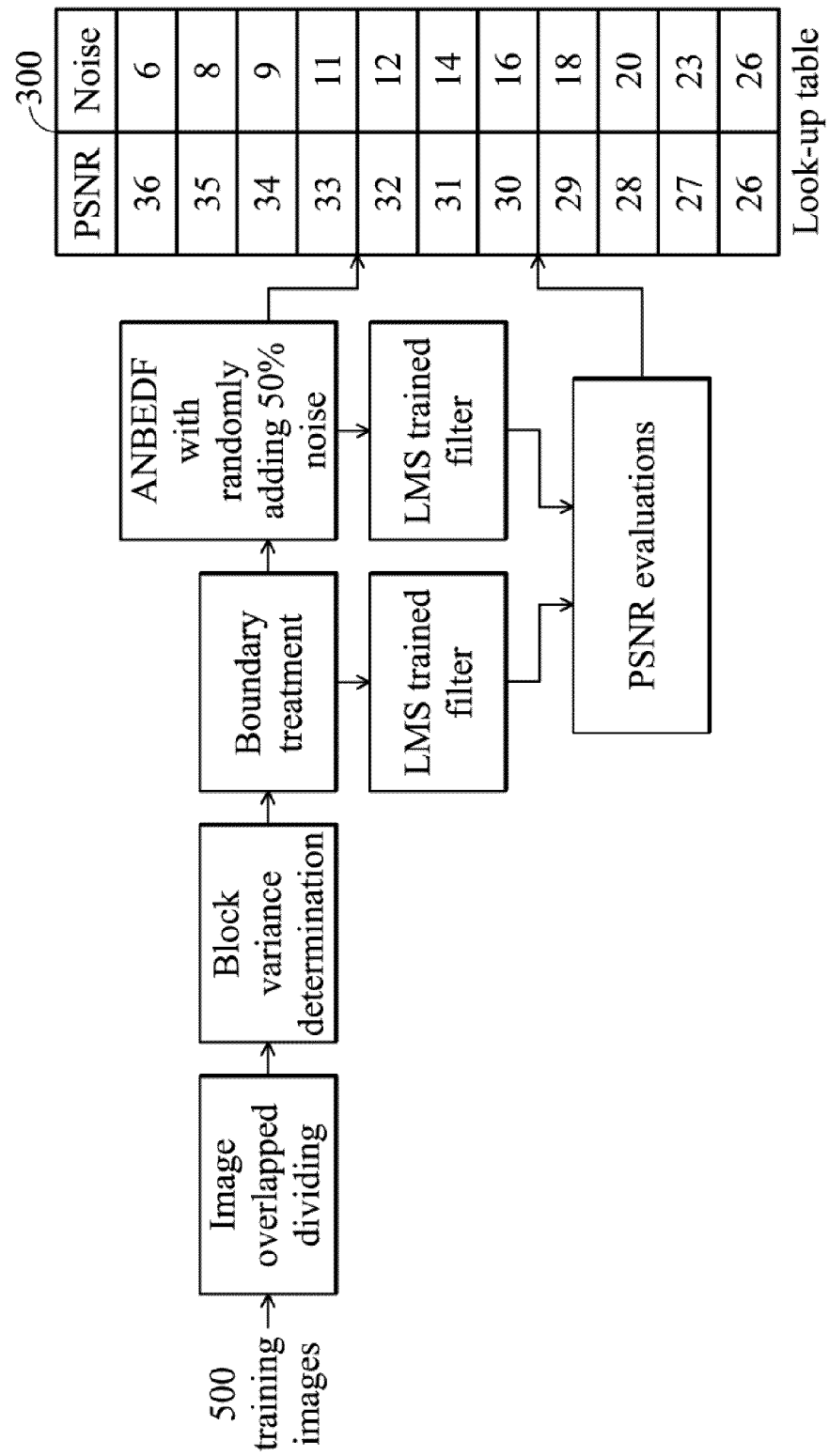
FIG. 3 shows an embodiment of the training system diagram for generating a look-up table.

The look-up table 1224 may further record a relationship of a variance area corresponding to the variance of each pixel, a signal to noise ratio (e.g. the PSNR) and a plurality of possible noise strengths, as shown in the following figures. In this embodiment, the look-up table 1224 may be a Quality Noise Look-Up Table (hereinafter referred to as QNLUT). That is, the PSNR and noise strength can be used as parameters to search the table. FIG. 3 shows an embodiment of a training system diagram for generating a look-up table. In this embodiment, 500 training images may be involved to provide an objective table. The main reason for developing QNLUT is that a scrap of modification in a low frequency region of an image can be discerned by the human eye. Meanwhile, more modifications in a high frequency region of an image can be tolerated by the human eye. Hence, the variance may be used to measure the local area frequency of an image. The strength of an additive noise, therefore, should be adaptively assigned according to the local area characteristic, wherein the mean and the valiance are defined as:

$$\overline{b}_{i,j} = \frac{\sum_{m,n \in M \times N} \sum b_{i+m,j+n}}{M \times N} \quad (8)$$

$$b^v_{i,j} = \frac{\sum_{m,n \in M \times N} \sum (b_{i+m,j+n} - \overline{b}_{i,j})^2}{M \times N} \quad (9)$$

where $\overline{b}_{i,j}$ and $b_{i,j}{}^v$ denote the mean and the variance of a block. As shown in FIG. 3, to build the QNLUT, the following steps should be performed: (1) partitioning all of the training images based on a specific block size; (2) quantizing the variance values to limited variance areas such that each of the variance areas has a variance amount with equal area distributions; (3) performing a boundary treatment process to extend the blocks; and (4) calculating the PSNR by a LMS trained filter. As shown in FIG. 3, each image is partitioned into overlapped blocks of size M×N, and the variance of each block is then calculated. Since larger block sizes increase complexity of the description, only size 3×3, 5×5, and 7×7 blocks are used for demonstration, but the invention is not limited thereto.

Figure 4:
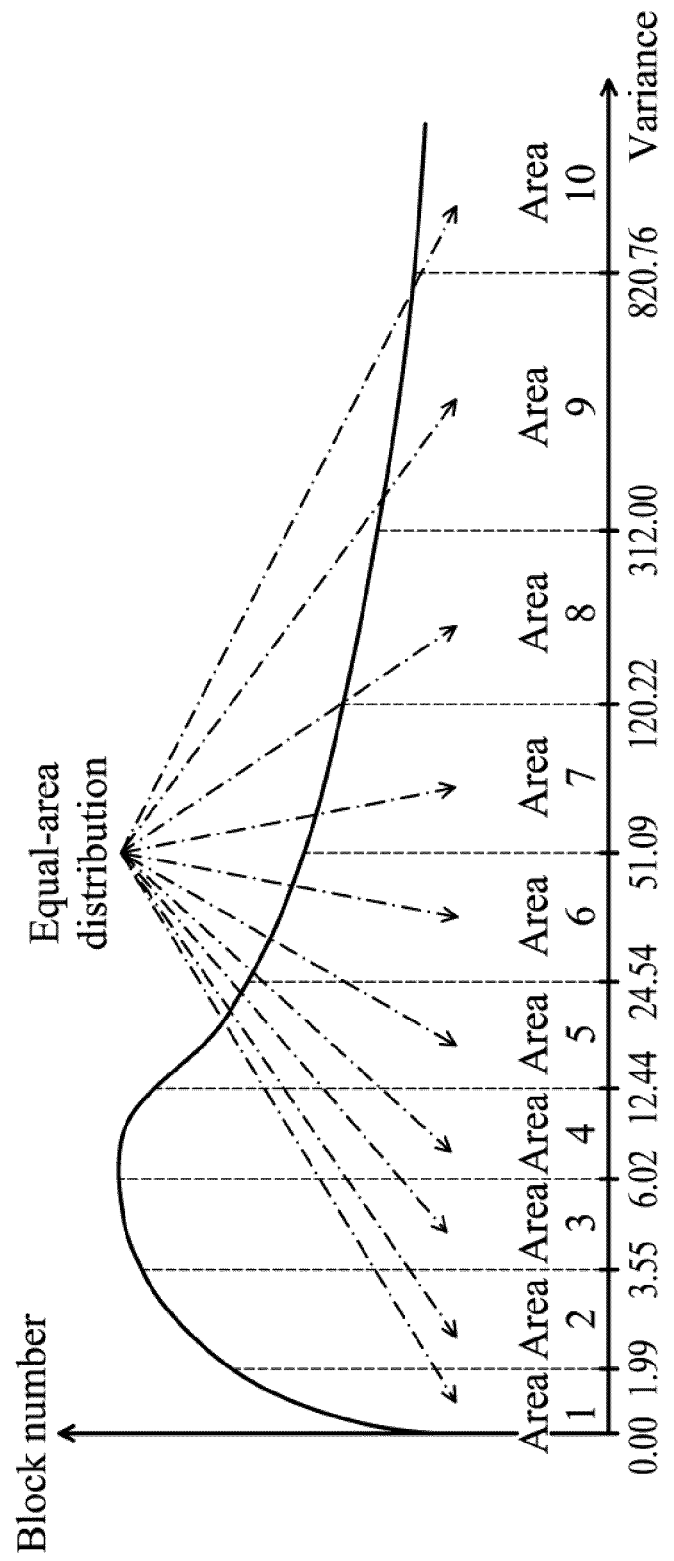
FIG. 4 shows an embodiment of distribution of the variance values according to the invention, wherein the variance values are quantized into limited areas, and each area has an equal area.
Figure 5:
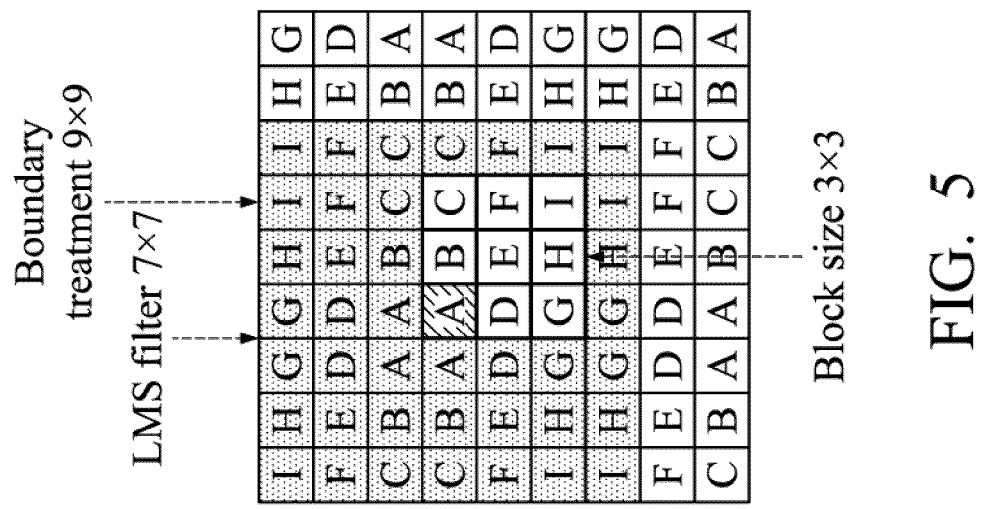
FIG. 5 shows an embodiment of a boundary treatment process according to the invention.

To build the QNLUT, the variance values are first quantized into limited areas, and each area has equal area (equal block number from the 500 training images), as illustrated in FIG. 4. To construct the relationship between PSNR and variable noise strength, each block is processed with a boundary treatment as illustrated in FIG. 5, which extends the size of a block from 3×3 to 9×9. In this embodiment, the boundary of the original block is duplicated and pasted to the extended area. The construction of the boundary treatment is due to the fact that the LMS-trained filter is of size 7×7, which may be used to evaluate the PSNR of a halftone pattern. Therefore, when the center of the LMS Filter covers the boundary of the original block, the extended portion may map to the exceeded LMS filter coefficients as the shadowed part in FIG. 5. The traditional NBEDF may then be applied to the extended block by randomly adding 50% noise, and the strength of the noise is varied from 1 to 26. The randomly added 50% noise is to make the experiments fairer, since a half region of the block is doped with noise. The reason that noise strength ranges from 1 to 26, is to maintain the image quality. The NBEDF result is a halftone, which is processed with the LMS trained filter and then the PSNR is evaluated with the original extended block. As a result, the look-up table 300 shown in FIG. 4 or look-up tables in diagram form as shown in FIGS. 6A-6C may be generated.

The noise strength determination module 122 receives the original image 160, calculates a corresponding variance for each pixel of the original image 160 by the valiance calculation unit and obtains the variable noise strength to be added for each pixel by searching the look-up table 1224 with the calculated variance of each pixel. For example, the noise strength determination module 122 may determine the variable noise strength for each pixel by using a possible noise strength corresponding to an intersection of the corresponding variance area and an expected signal to noise ratio. When the intersection does not correspond to any of the possible noise strengths, the noise strength determination module 122 may determine that a possible noise strength which is closest to the intersection, is set to be the variable noise strength which is added to each pixel. For example, please refer to FIGS. 6A to 6C, which illustrate embodiments of the look-up table according to the invention. As shown, the variances are classified into 10 areas Area 1-Area 10 and the possible noise strengths range from 1 to 26. Refer to FIG. 4, if the PSNR is set to 36 and the variance is 20, the variance 20 is located in Area 5 while the Area 5 and PSNR is 32, intersected in a line, represent that the noise strength is 13 (refer to point A shown in FIG. 6A). Therefore, the noise strength can be set to be 13. Alternatively, if the PSNR is set to 32 and the variance is 1.5, the variance 1.5 is located in Area 1 while the Area 1 and PSNR is 32, intersected between the lines, represent that the noise strength are 1.3 and 14 and close to the line representing that the noise strength is 13 (refer to point B shown in FIG. 6A). Therefore, the noise strength can be set to be 13.

For example, in this embodiment, the block size is fixed at 3×3 as an example to elaborate the details of the QNLUT development procedure. It is assumed that a horizontal line is drawn in FIG. 6A at level PSNR=36 dB. A large number of configurations of training images and secret patterns are used to test the corresponding reconstructed PSNRs using the ANBEDF method of the invention. In one embodiment, 500 training images and 60 secret patterns, or an overall of 30000 configurations, are provided. In other words, variance for each pixel is calculated and a corresponding variance area is determined, wherein the associated pixel in the secret pattern is embedded using the noise strength that has an intersection with the line PSNR=36 and the corresponding variance. Since the system is a nonlinear system and each pixel of the training images is processed with the ANBEDF, the corresponding PSNR is generally not exactly equal to 36 dB. Hence, the average PSNR of the embedded images is calculated and denoted as $PSNR_{36}^{ANBEDF}$, where the lower subscription 36 represents the horizontal line PSNR=36. Note that the PSNR value represented by the horizontal line close to the horizontal line PSNR=36 is chosen as the average PSNR of the embedded images.

Figure 6A:
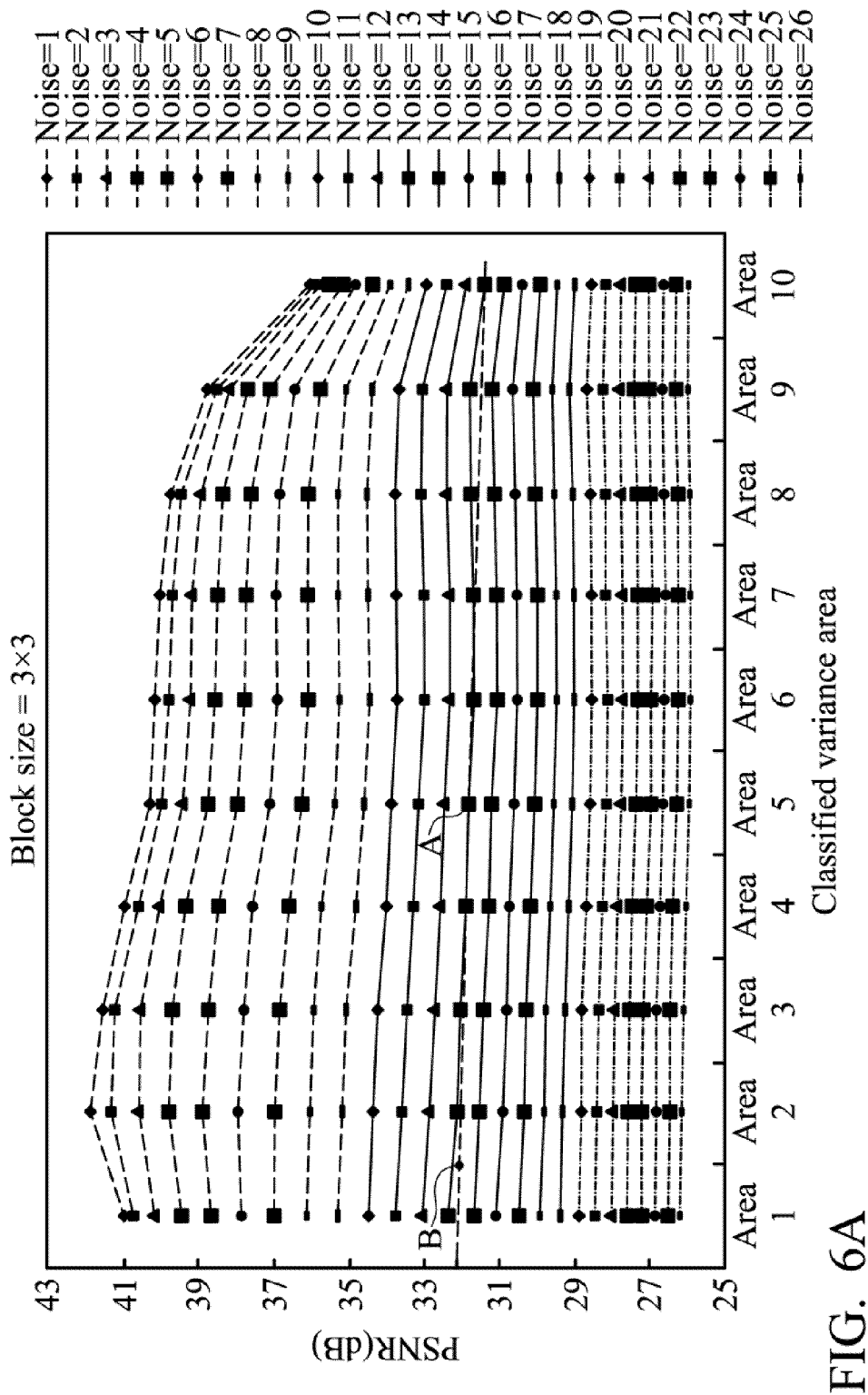
FIGS. 6A to 6C show embodiments of the look-up tables according to the invention.
Figure 6B:
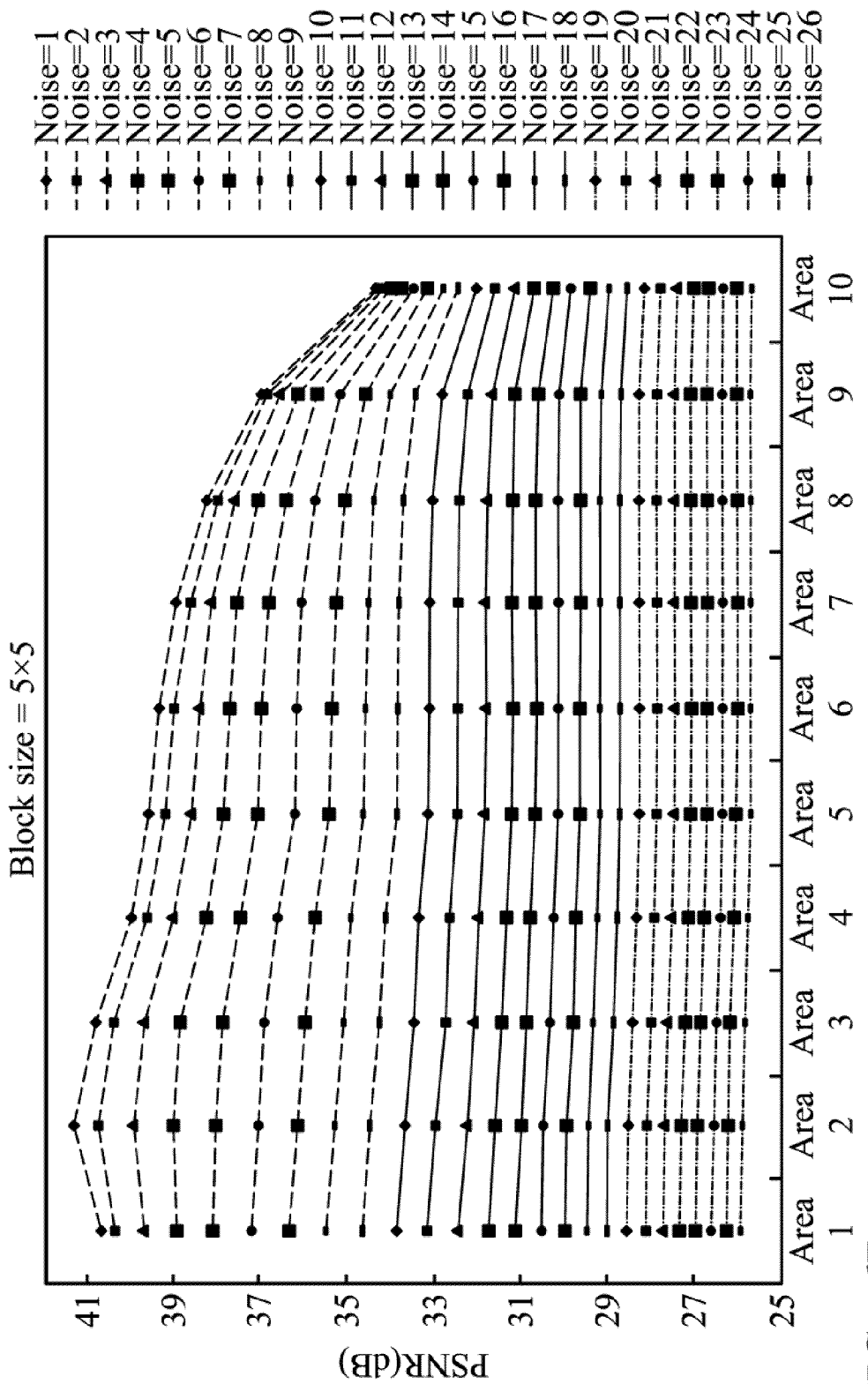
Figure 6C:
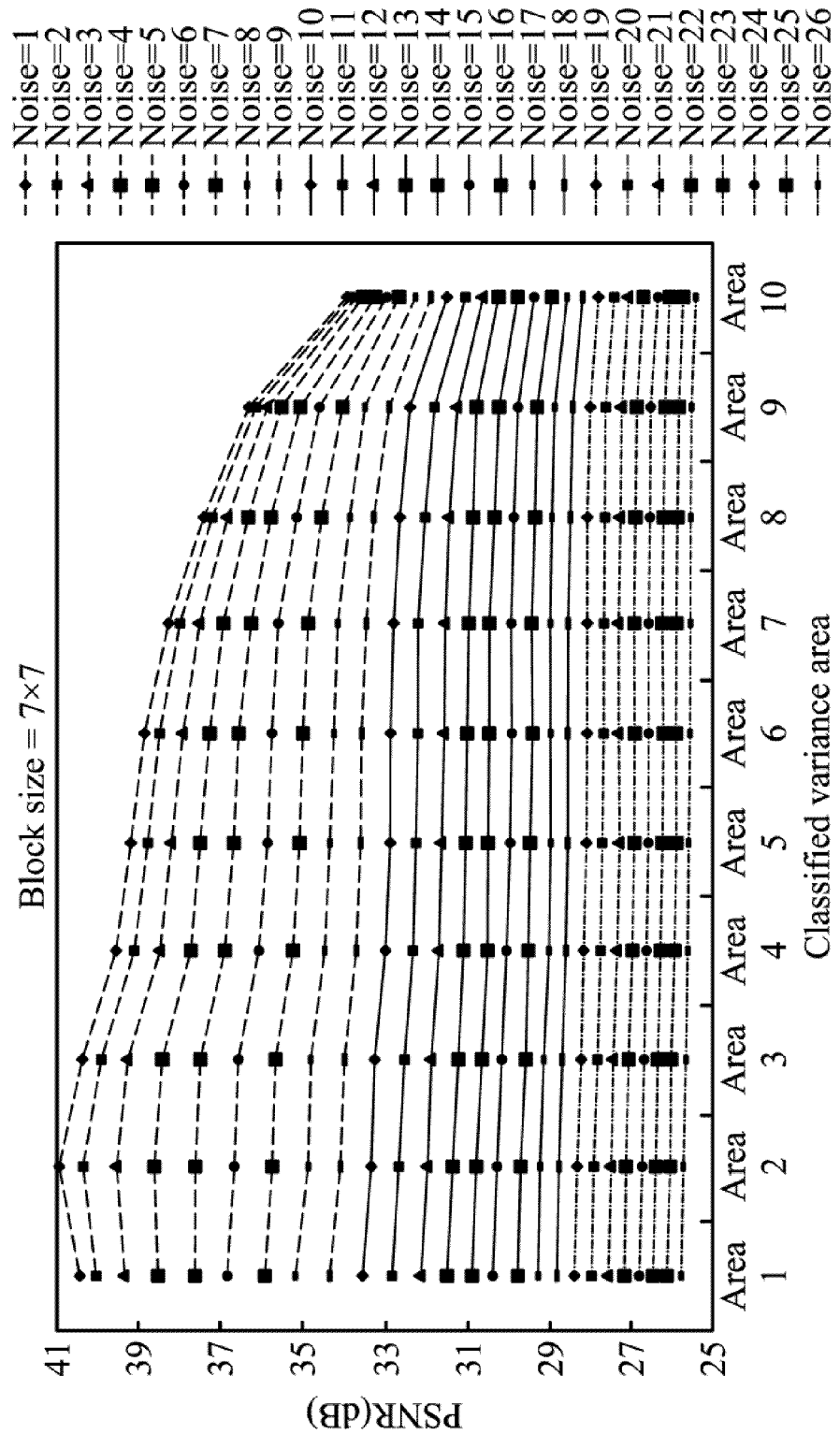

Notably, the adaptive noise strength as addressed in FIGS. 6A-6C cannot provide the optimized results from the experimental results. For example, for a given PSNR, if the noise strengths of different areas are multiplied with appropriate multipliers, the overall CDR can be improved. Therefore, the noise strength determination module 122 may further determine an optimized multiplier corresponding to the variable noise strength for each of the variance areas. An example of an optimized multiplier list of the invention is organized in Table 1.

TABLE 1

| Block size = 3 × 3 | | | Block size = 5 × 5 | | | Block size = 7 × 7 | | |
|---|---|---|---|---|---|---|---|---|
| Area (i) | Variance range | $\alpha_i$ | Area (i) | Variance range | $\alpha_i$ | Area (i) | Variance range | $\alpha_i$ |
| 1 | [0.00, 1.99] | 0.96 | 1 | [0.00, 2.96] | 1.02 | 1 | [0.00, 3.41] | 1.18 |
| 2 | (1.99, 3.55] | 1.08 | 2 | (2.96, 4.63] | 0.93 | 2 | (3.41, 6.00] | 1.13 |
| 3 | (3.55, 6.02] | 1.13 | 3 | (4.63, 10.88] | 0.98 | 3 | (6.00, 16.18] | 0.93 |
| 4 | (6.02, 12.44] | 0.86 | 4 | (10.88, 24.01] | 1.03 | 4 | (16.18, 38.08] | 1.14 |
| 5 | (12.44, 24.54] | 0.98 | 5 | (24.01, 52.13] | 1.16 | 5 | (38.08, 92.38] | 1.03 |
| 6 | (24.54, 51.09] | 1.2 | 6 | (52.13, 123.85] | 1.26 | 6 | (92.38, 223.77] | 1.29 |
| 7 | (51.09, 120.22] | 1.04 | 7 | (123.85, 296.07] | 1.3 | 7 | (223.77, 481.39] | 1.46 |
| 8 | (120.22, 312.00] | 1.21 | 8 | (296.07, 664.35] | 1.4 | 8 | (481.39, 937.88] | 1.39 |
| 9 | (312.00, 820.76] | 1.5 | 9 | (664.35, 1361.21] | 1.32 | 9 | (937.88, 1697.53] | 1.52 |
| 10 | >820.76 | 1.95 | 10 | >1361.21 | 1.94 | 10 | >1697.53 | 1.99 |

It is known from Table 1 that each area is given a different multiplier and thus an optimized multiplier corresponding to a specific block size and a specific variance can be obtained therefrom. For example, if the block size is 3×3 and the variance is located in the Area 1, the optimized multiplier is set to 0.96. The practical usage of the multipliers is given as blow:

$$ANS_i = NS_{LUT(PSNR)} \times \alpha_i, i=1\sim10 \quad (10)$$

where $ANS_i$ denotes the adaptive noise strength of Area i, $NS_{LUT(PSNR)}$ denotes the noise strength of the FIGS. 7(a)-(c) when a specific PSNR is selected, and $\alpha_i$ denotes the multiplier of Area i. The optimized multipliers can be obtained by an iteration method. In one embodiment, the optimized multipliers can be obtained by the following steps:

Step 1: A cost function is established below, where the coefficient. A along with the PSNR is determined as 10 from experiments, and k denotes the iteration number.

$$Cost(k) = A \times PSNR + CDR.$$

When A is too small, the optimization results are favor to the performance of the CDR. In other words, the overall cost and CDR are monotonically increased when the values of the multipliers increase, and the PSNR is monotonically decreased. Conversely, when A is too large, the optimization results are favor to the performance of the PSNR. In other words, the overall cost and PSNR are monotonically increased when the values of the multipliers increase, and the CDR is monotonically decreased. A balanced A value may be used for implementation.

Step 2: The multipliers $\alpha_i^k$ are initially set at 0.1. where k denotes an iteration number and $i \in [1, \ldots, 10]$ denotes the area number as in Table 3.

Step 3: $\alpha_1^k$ is increased to 10 by an increment 0.01 each time, while the rest of the nine multipliers are unchanged. The 1000 modified $\alpha_1^k$ take turns to be combined with the rest of the nine multipliers and then the cost function is applied as given in Step 1 to measure which value of $\alpha_1^k$ achieves the highest score. The value corresponding to the highest score is selected as the best value in the current iteration.

Step 4: The remaining $\alpha_1^k$, $i \in \{2, \ldots, 1\}$ sequentially replaces the role of $\alpha_1^k$ in Step 3. One iteration is finished when each of all of the 10 multipliers has its temporary optimized value.

Step 5: The optimization is terminated when a condition $|Cost(k)-Cost(k-1)|<0.05$ has been satisfied; otherwise, Steps 2 to 4 will be repeated.

Figure 7:
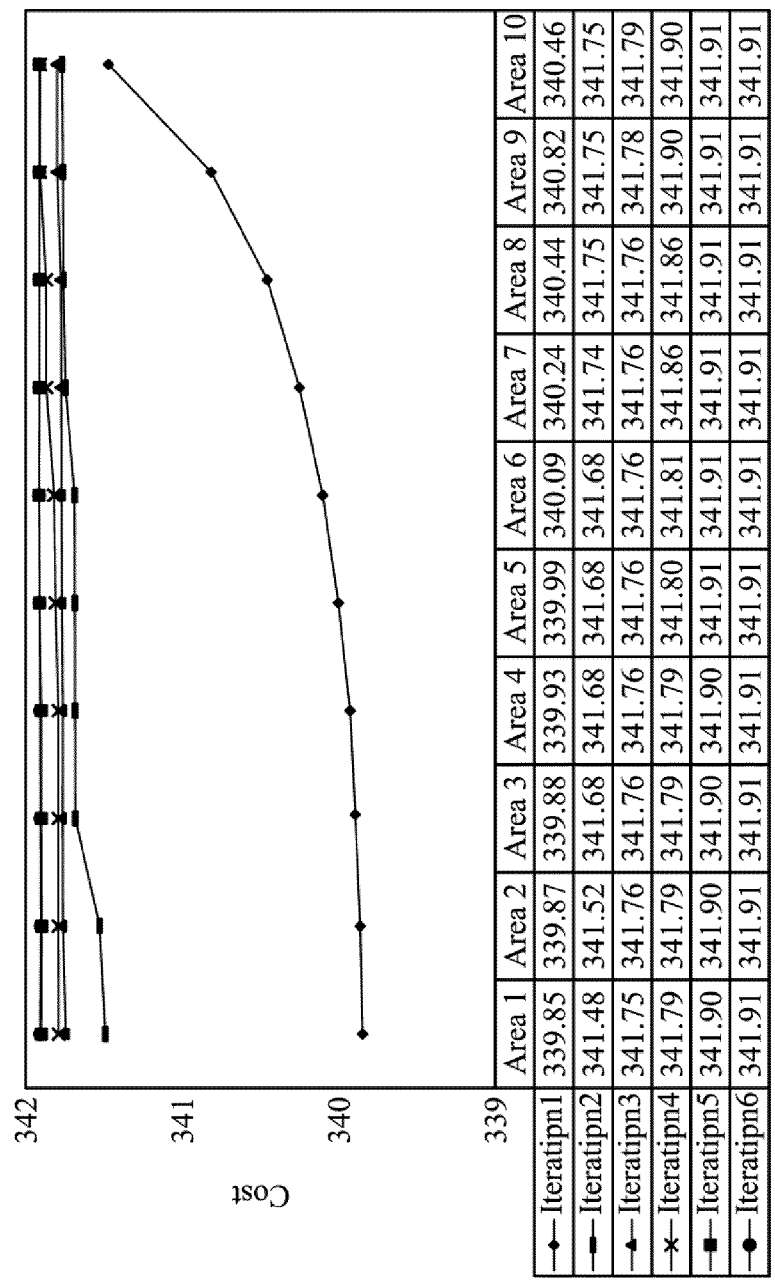
FIG. 7 shows an embodiment of an optimized multiplier determination process according to the invention.

FIG. 7 shows an embodiment of an optimized multiplier determination process according to the invention, which shows the overall cost optimized results as each optimized multiplier is selected in each iteration. As shown in FIG. 7, the difference between the last two lines is less than 0.5 and thus the condition $|Cost(k)-Cost(k-1)|<0.05$ has been satisfied. An optimized result, therefore, may be obtained.

After the aforementioned look-up table and the associated optimized multiplier list have been generated, the data hiding method of the invention may further be used to embed the secret image.

Figure 8A:
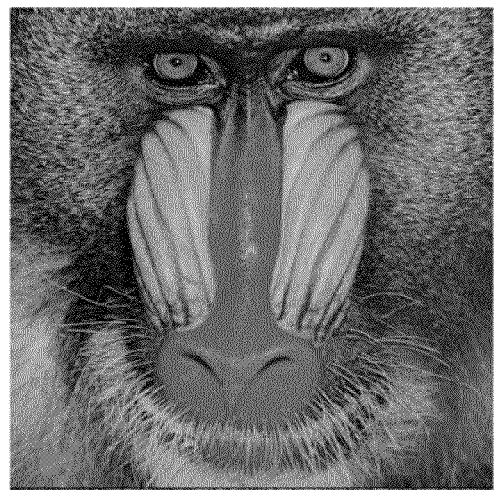
FIGS. 8A and 8B respectively show embodiments of an original image and a secret image according to the invention.
Figure 8B:
Figure 9A:
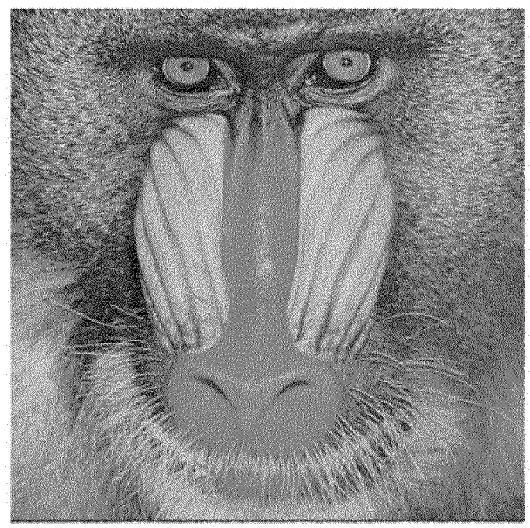
FIGS. 9A and 9B respectively show embodiments of first and second halftone images generated by the error diffusion process according to the invention.
Figure 9B:
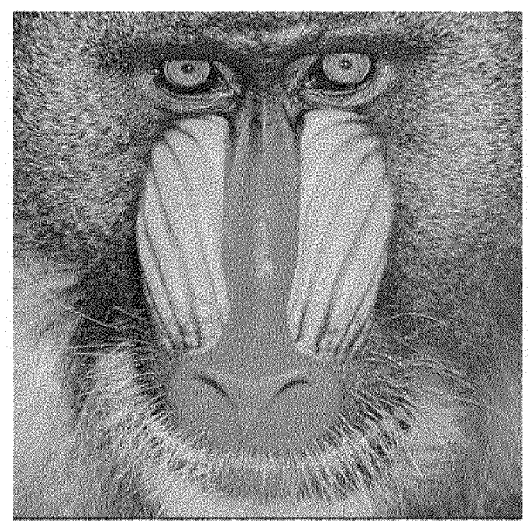
Figure 10A:
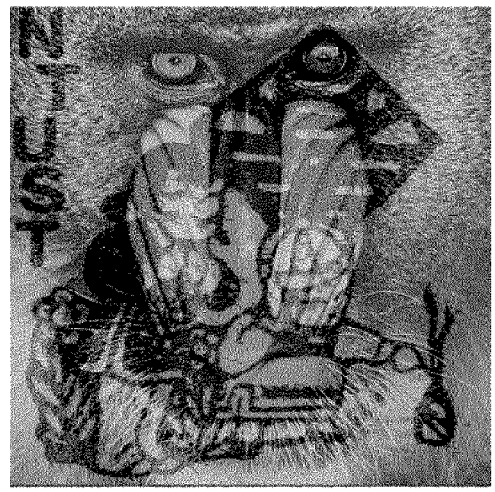
FIG. 10A shows an embodiment of a decoded image decoded by separately printing the first halftone image and the second halftone image to first and second transparences and then directly overlapping the first and second transparences.
Figure 10B:
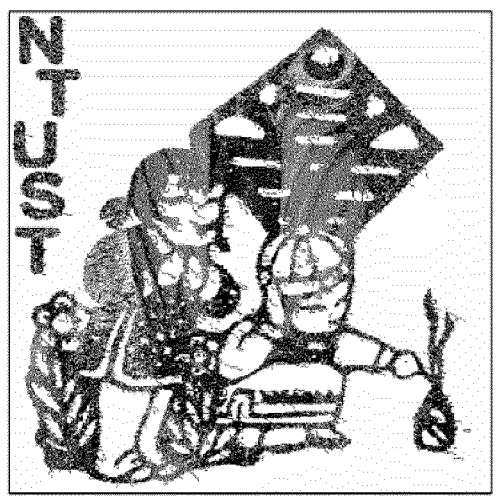
FIG. 10B shows an embodiment of a decoded image decoded by performing an XNOR logical operation with the first halftone image and the second halftone image.

Referring again to FIG. 1A, the system 100 may further comprise a decoding module 140 which is coupled to the image output module 130 and receives the first halftone image 180 and the second halftone image 190 from the image output module 130 and utilizes the first halftone image 180 and the second halftone image 190 to decode the embedded secret image 170. For example, the decoding module 140 may separately print the first halftone image 180 and the second halftone image 190 on first and second transparences and directly overlap the first and second transparences to decode and obtain the secret image 170. In one embodiment, the decoding module 140 may further perform an XNOR logical operation with the first halftone image 180 and the second halftone image 190 to decode the secret image 170. Please refer to FIGS. 8A-10B. FIGS. 8A and 8B respectively show embodiments of the original image and the secret image according to the invention. FIGS. 9A and 9B respectively show embodiments of the first and second halftone images generated by the error diffusion process according to the invention. FIG. 10A shows an embodiment of a decoded image 200 decoded by separately printing the first halftone image 180 and the second halftone image 190 to first and second transparences and then directly overlapping the first and second transparences. FIG. 10B shows an embodiment of a decoded image 200 decoded by performing an XNOR logical operation with the first halftone image 180 and the second halftone image 190. It can be observed from the figures that the original secret image can be directly decoded and obtained regardless of which decoding method is used.

Figure 11:
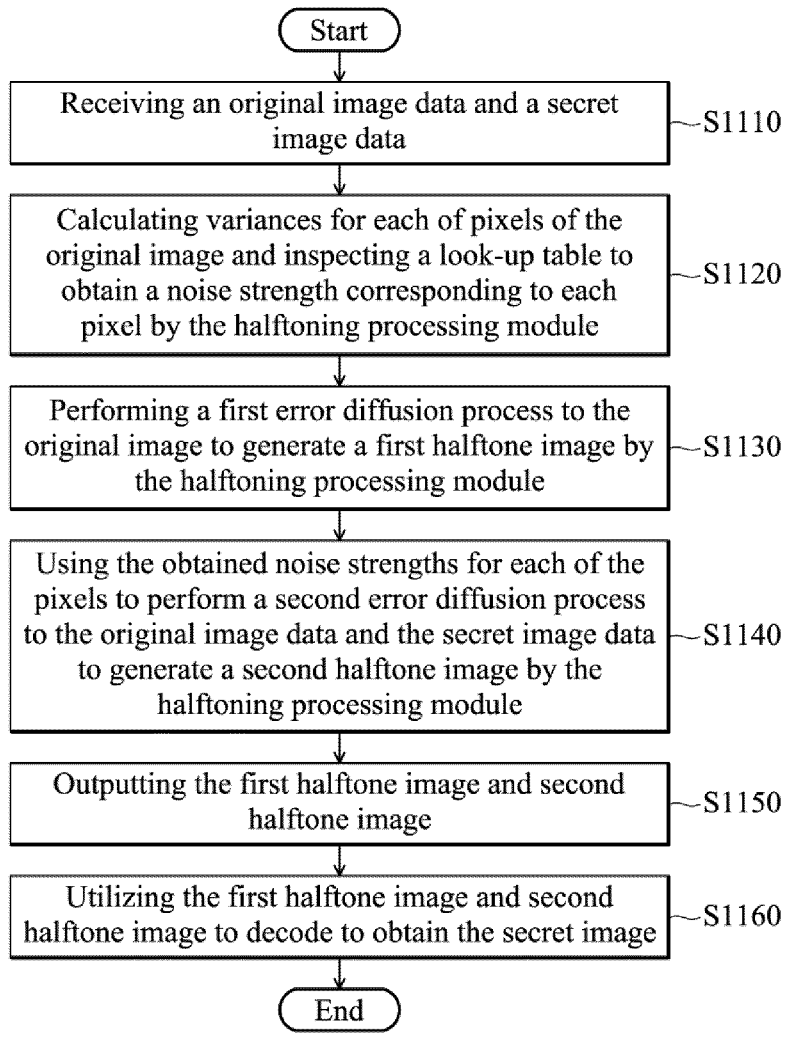
FIG. 11 is a flowchart showing an embodiment of a data hiding method for hiding data of a secret image into halftone images according to the invention.

FIG. 11 is a flowchart showing an embodiment of a data hiding method for hiding data of a secret image into halftone images according to the invention. The data hiding method of the invention can be applied in the system 100 shown in FIG. 1A. First, in step S1110, an original image 160 and a secret image 170 are received by the data input module 110. Next, in step S1120, the signal strength determination module 122 of the halftoning processing module 120 calculates a variance for each pixel of the original image and obtains corresponding noise strength for each pixel by searching the look-up table 1224 with the corresponding calculated variance. For each pixel, the corresponding signal strength may further comprise an optimized multiplier and the first noise adjustment module 124 may determine to add or subtract noise thereto based on previously described signal strength determination method. Thereafter, in step S1130, the halftoning processing module 120 performs a first error diffusion process (e.g. the well-known Floyd error diffusion method) to the original image 160 to generate a first halftone image 180. Meanwhile, the halftoning processing module 120 further performs a second error diffusion process (i.e. the ANBEDF method of the invention) to the original image 160 and the secret image 170, using the corresponding noise strength of each pixel, to generate a second halftone image 190. Then, in step S1150, the image output module 160 outputs the first halftone image 180 and the second halftone image 190. Therefore, the secret image has been embedded into the second halftone image 190. Lastly, in step S1160, the decoding module 140 may utilize the first halftone image 180 and the second halftone 190, e.g. separately printing the first halftone image 180 and the second halftone image 190 to the first and second transparences and then directly overlap the first and second transparences or performing an XNOR logical operation with the first and second halftone images 180 and 190, so as to decode and obtain the secret image 170.

It is understood that although each of the aforementioned modules or units of the invention has been illustrated as a single component of the system, two or more such components can be integrated together, thereby decreasing the number of the components within the system. Similarly, one or a multiple of the above components can be separately used, thereby increasing the number of the components within the system. In addition, the modules or the unit components of the invention can be implemented by any hardware, firmware, or software methods or combination thereof.

Systems and data hiding methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A system for hiding secret data in halftone images, comprising:

an image input module, executed on a processor, reading an original image data and a secret image data;

a halftoning processing module coupled to the image input module, executed on the processor, receiving the original image data and the secret image data, performing a first error diffusion process to the original image to generate a first halftone image and performing a second error diffusion process to the original image data and the secret image data to generate a second halftone image; and an image output module coupled to the halftoning processing module, executed on the processor, outputting the first halftone image and the second halftone image, wherein the second error diffusion process comprises adding or subtracting a variable noise strength to or from each pixel of the secret image and wherein the halftoning processing module further comprises a noise strength determination module for providing the variable noise strength to be added to each pixel of the second halftone image, wherein the noise strength determination module receives the original image, calculates a corresponding variance for each pixel of the original image and obtains the variable noise strength for each pixel by searching a look-up table with the calculated variance for each pixel and the halftoning processing module further comprises:
a first noise adjustment module coupled to the noise strength determination module for adding or subtracting the corresponding variable noise strength from or to each pixel according to pixel values of the first halftone image and pixel values of the secret image;
a quantizor coupled to the first noise adjustment module for generating the second halftone image according to a predetermined threshold; and
a second noise adjustment module coupled to the quantizor for subtracting or adding the corresponding variable noise strength from or to each pixel in response to the first noise adjustment module.

2. The system of claim 1, wherein the first noise adjustment module further determines to subtract the variable noise strength from a pixel of the second halftone image when the pixel value of the corresponding pixel of the first halftone image or the pixel value of the corresponding pixel of the secret image represents a black pixel and determines to add the variable noise strength to the pixel of the second halftone image when both the pixel value of the corresponding pixel of the first halftone image and the pixel value of the corresponding pixel of the secret image represent black pixels or represent white pixels.

3. The system of claim 1, wherein the second noise adjustment module is used to subtract the variable noise strength from a pixel of the second halftone image when the first noise adjustment module is used to add the variable noise strength to the pixel of the second halftone image, and the second noise adjustment module is used to add the variable noise strength to the pixel of the second halftone image when the first noise adjustment module is used to subtract the variable noise strength from the pixel of the second halftone image.

4. The system of claim 1, wherein the look-up table further records a relationship of a variance area corresponding to the variance of each pixel, a signal to noise ratio and a plurality of possible noise strengths, and the noise strength determination module determines the variable noise strength for each pixel using a possible noise strength corresponding to an intersection of the corresponding variance area and a signal to noise ratio.

5. The system of claim 4, wherein a possible noise strength closest to the intersection is set to be the variable noise strength for each pixel when the intersection does not correspond to any of the possible noise strengths.

6. The system of claim 4, wherein the noise strength determination module further determines a corresponding optimized multiplier for each of the variance areas and generates the variable noise strength by multiplying the possible noise strength with the corresponding optimized multiplier for each pixel.

7. The system of claim 1, wherein the corresponding optimized multiplier for each pixel is obtained by an iteration manner.

8. The system of claim 1, further comprising a decoding module coupled to the image output module for receiving the first and second halftone images from the image output module, separately printing the first and second halftone images to first and second transparences and then directly overlapping the first and second transparences to decode and obtain the secret image.

9. The system of claim 7, wherein the decoding module further performs an XNOR logical operation with the first and second halftone images to decode and obtain the secret image.

10. A data hiding method for hiding data of a secret image into halftone images for use in a system which comprises at least one halftoning processing module and one image output module, wherein the method comprises:
receiving an original image and a secret image;
calculating, by the halftoning processing module, a variance for each pixel of the original image;
obtaining, by the halftoning processing module, a corresponding noise strength for each pixel by searching a look-up table with the calculated variance corresponding thereto;
performing, by the halftoning processing module, a first error diffusion process to the original image to generate a first halftone image;
performing a second error diffusion process to the original image and the secret image to generate a second halftone image; and
outputting, by the image output module, the first halftone image and the second halftone image,
wherein the secret image is obtained by decoding the first and second halftone images and
wherein the step of generating a second halftone image further comprises:
adding or subtracting the variable noise strength to each pixel according to a pixel value of the first halftone image and a corresponding pixel value of the secret image,
wherein the variable noise strength is subtracted from a pixel of the second halftone image when the pixel value of the corresponding pixel of the first halftone image or the pixel value of the corresponding pixel of the secret image represents a black pixel, and the variable noise strength is added to the pixel of the second halftone image when both the pixel value of the corresponding pixel of the first halftone image and the pixel value of the corresponding pixel of the secret image represent black pixels or represent white pixels.

11. A data hiding method for hiding data of a secret image into halftone images for use in a system which comprises at least one halftoning processing module and one image output module, wherein the method comprises:
receiving an original image and a secret image;
calculating, by the halftoning processing module, a variance for each pixel of the original image;
obtaining, by the halftoning processing module, a corresponding noise strength for each pixel by searching a look-up table with the calculated variance corresponding thereto;
performing, by the halftoning processing module, a first error diffusion process to the original image to generate a first halftone image;
performing a second error diffusion process to the original image and the secret image to generate a second halftone image; and
outputting, by the image output module, the first halftone image and the second halftone image;
wherein the secret image is obtained by decoding the first and second halftone images and wherein the look-up table further records a relationship of a variance area corresponding to the variance of each pixel, a signal to noise ratio and a plurality of possible noise strengths, and the step of obtaining a corresponding noise strength for each pixel further comprises:

utilizing a possible noise strength corresponding to an intersection of the corresponding variance area and a signal to noise ratio to determine the variable noise strength for each pixel.

* * * * *